Figure 1:
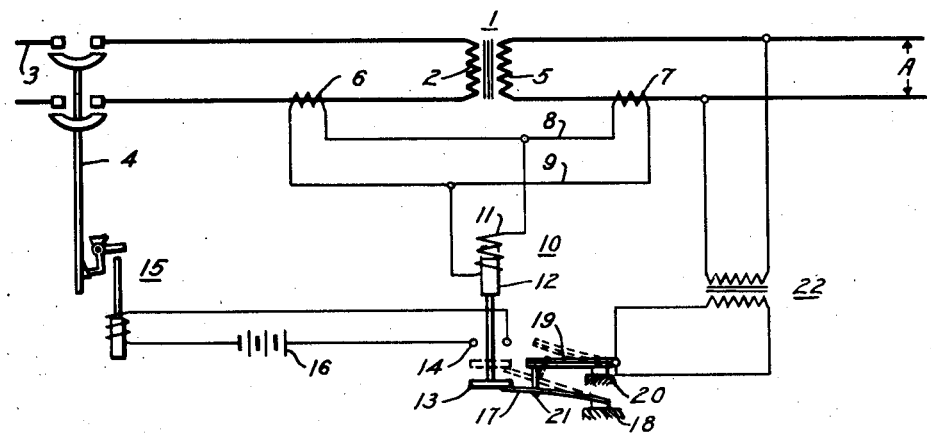

April 28, 1942.    G. M. BARROW ET AL    2,280,884
DIFFERENTIAL RELAY
Filed Nov. 4, 1939

WITNESSES:

INVENTORS
George M. Barrow and
Bernard E. Lenehan.
BY
ATTORNEY

Patented Apr. 28, 1942

2,280,884

UNITED STATES PATENT OFFICE 2,280,884

DIFFERENTIAL RELAY

George M. Barrow, Nutley, and Bernard E. Lenehan, Bloomfield, N. J., assignors to Westinghouse Electric & Manufacturing Company, East Pittsburgh, Pa., a corporation of Pennsylvania Application November 4, 1939, Serial No. 302,938

11 Claims. (Cl. 175—294)

This invention relates to electrical relays, and it has particular relation to differential relays for protecting electrical apparatus against internal faults.

Differential relays are in general service for protecting various electrical apparatus such as power transformers and multi-terminal buses against the occurrence of internal faults. As generally employed, a differential relay includes an armature which is controlled in accordance with the resultant of two functions. The first function corresponds to the difference between electrical current entering and leaving the electrical apparatus to be protected. The second function corresponds to the sum of the currents entering and leaving the electrical apparatus. Although such a differential relay admirably protects apparatus against internal faults, it has not been applied to certain classes of electrical apparatus because of excessive size, complexity or expense of the relay.

In accordance with our invention, a differential relay is provided which is responsive to only one of the functions referred to in the preceding paragraph, namely, the difference between current entering and leaving the electrical apparatus or system to be protected. Consequently, the relay may take a simple form such as that of a simple overcurrent relay of the solenoid type which is compact, simple and inexpensive.

When a differential relay responsive to the difference between currents entering and leaving an electrical system is applied to certain classes of electrical apparatus incorrect operation may result because of the occurrence of transient currents. For example, when an electrical transformer is initially connected to a source of energy, a transient current flows which may be termed a magnetizing in-rush current. If a differential relay responsive to the difference between currents entering and leaving the transformer were adjusted for sensitive operation under normal conditions, the magnetizing in-rush current may suffice to cause an incorrect operation of the relay.

In order to preclude incorrect operation of our differential relay, we provide means for adjusting the sensitivity of the relay. That is, the relay is adjusted from an insensitive condition to a sensitive condition as a transient current such as the magnetizing in-rush current above referred to decays or disappears. In a preferred embodiment of our invention, the sensitivity of the relay is controlled by a thermal responsive element such as a bimetallic thermostat which is energized from the electrical apparatus or system to be protected. When the system is de-energized, the thermal responsive element is cool and conditions the relay for insensitive operation. When the system is energized, the thermal responsive element is heated and gradually conditions the relay for sensitive operation.

It is, therefore, an object of our invention to provide a simple and compact differential relay.

It is another object of our invention to provide a differential relay which does not respond to transient electrical conditions.

It is a further object of our invention to provide a differential relay having a sensitive setting under normal operating conditions and an insensitive setting when the electrical system protected thereby is not in normal operating condition.

It is a further object of our invention to provide a differential relay responsive only to the difference between currents entering and leaving an electrical system to be protected and having a sensitivity which increases after the system is energized.

It is a still further object of our invention to provide a differential relay having thermal responsive means for varying the sensitivity thereof.

It is another object of our invention to provide a differential relay responsive to the difference between currents entering and leaving a system to be protected and having thermal responsive means energized from the system for controlling the sensitivity of the relay.

It is a still further object of our invention to provide a differential relay for a system subject to transient current wherein the sensitivity of the relay increases gradually as a transient current present in the system decays.

Figure 2:
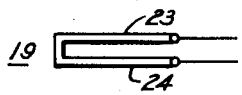
Figure 3:
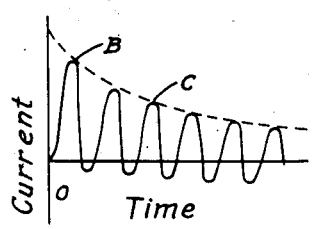
Figure 4:
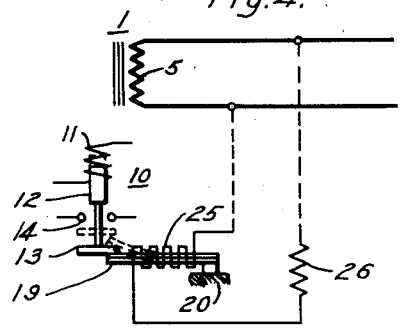
Figure 5:
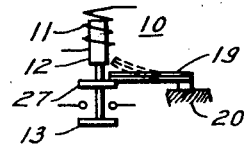

Other objects of our invention will be apparent from the following description taken in conjunction with the accompanying drawing, in which:

Figure 1 is a diagrammatic view of an electrical system embodying our invention, Fig. 2 is a detailed view in top plan of a thermal responsive element suitable for the system disclosed in Fig. 1, Fig. 3 is a graphical view of current conditions in the system of Fig. 1, and Figs. 4 and 5 are detail views showing modifications of the system illustrated in Fig. 1.

Referring to the drawing, Fig. 1 shows an electrical transformer 1 which is to be protected against the occurrence of internal faults. This transformer has a primary winding 2 which has its terminals connected for energization from a feeder 3 or other source of alternating current through a circuit breaker 4. The transformer also includes a secondary winding 5 which may be employed for supplying electrical energy through its terminals to a load as well understood in the art.

In order to provide differential protection for the transformer 1, currents proportional to the currents flowing in the primary and secondary windings of the transformer are supplied to a series or circulating current circuit. In the specific embodiment of Fig. 1, a current transformer 6 is placed in the primary circuit of the transformer 1 and a second current transformer 7 is placed in the secondary circuit of the transformer. The secondaries of these current transformers are connected by conductors 8 and 9 in an additive series circuit. These current transformers are so designed that the currents supplied thereby to the conductors 8 and 9 during normal operation of the transformer are substantially equal. Consequently, substantially no voltage appears between the conductors 8 and 9.

A relay 10 is controlled by the difference between currents flowing in the secondaries of the current transformers 6 and 7. This relay which may be of a simple solenoid overcurrent type, has an energizing winding 11 connected across the conductors 8 and 9 and an armature 12 which is connected to a bridging contact 13 for actuating the bridging contact into and out of bridging relationship across a pair of fixed contacts 14. These contacts may be employed for any suitable control purpose. As illustrated, they complete a tripping circuit for a tripping solenoid 15 provided for the circuit breaker 4. A battery 16 or other source of electrical energy may be employed for energizing the tripping circuit.

In the construction thus far described, substantially no current flows in the winding 11 during normal operation of the transformer 1. If a fault occurs at a point external to the transformer 1, such as at the point A, the currents flowing through the current transformers 6 and 7 still are substantially equal, assuming that the performance characteristics of the current transformers are substantially similar. Consequently, under this condition the winding 11 still will be substantially deenergized. However, should an internal fault occur within the transformer 1, the current flowing through the transformer 7 no longer equals that flowing through the transformer 6, and the difference between the secondary currents of these transformers flows through the winding 11 of the relay 10 to actuate the relay into its tripping condition.

The relay 10 may be so designed that it is not affected by the magnetizing current flowing under normal operating conditions of the transformer 1. However, when the circuit breaker 4 is closed for initially energizing the transformer 1, a substantial magnetizing current flows for a brief interval. This transient magnetizing in-rush current may be sufficient to actuate the relay 10 with a consequent undesirable operation of the tripping solenoid 15. In order to prevent this undesirable operation, the relay 10 is provided with an adjustment for rendering it insensitive during the period of flow of the magnetizing in-rush current.

As illustrated in Fig. 1, the adjustment of a simple solenoid relay for insensitive operation may be provided by varying the displacement of the solenoid armature with reference to its energizing winding. In Fig. 1 the solenoid 12 is adjustable between a full line insensitive position and a sensitive position illustrated by dotted lines. The movement of the relay between these two positions may be controlled in any suitable manner. As illustrated in Fig. 1, a spring 17 is attached at one end to a fixed support 18 to form a cantilever spring. This spring normally biases the armature 12 into the position shown in Fig. 1 by dotted lines, that is the sensitive position of the solenoid.

Movement of the solenoid armature 12 into its insensitive position is controlled by a thermal responsive element such as a bimetallic thermostat 19 which is attached at one end to a fixed support 20. The free end of the thermostat 19 in its cold condition depresses the spring 17 through a connecting pin 21, which may be attached to the spring, into the position illustrated in full lines in Fig. 1. In other words, when the thermostat 19 is cold, it depresses the spring 17 permitting the solenoid armature 12 to drop to its insensitive position. The thermostat 19 is energized in any suitable manner from the system to be protected. As illustrated in Fig. 1, the thermostat is connected to the secondary of a voltage transformer 22, the primary of which is connected across the secondary of the transformer 1. As will be apparent from the following discussion, the thermostat 19 also could be energized from the primary circuit of the transformer 1.

Any suitable means for heating the thermostat 19 may be employed. As illustrated in Fig. 2, the thermostat 19 is provided with a U-shape having two legs 23 and 24. These legs are connected respectively to the terminals of the secondary of the transformer 22. Consequently, the thermostat is heated directly by current flowing therethrough.

It is believed that the operation of the apparatus thus far described is apparent from the foregoing description. When the circuit breaker 4 is in its open position, the various parts of the differential relay are in the positions indicated in full lines in Fig. 1. Under these circumstances the relay 10 is in its insensitive condition and may, for example, require six times the energizing current for operation that it requires in its sensitive condition. When the circuit breaker 4 is closed, a magnetizing in-rush current flows to the transformer 1 and tends to produce a difference current for energizing the winding 11. However, since the relay 10 is in its insensitive condition, the magnetizing in-rush current is unable to actuate the relay to its closed condition and consequently cannot cause incorrect tripping of the circuit breaker 4.

At the same time the energization of the transformer 1 energizes the voltage transformer 22 and the thermostat 19. As the thermostat 19 heats it bends slowly into the position indicated by dotted lines in Fig. 1. This movement of the thermostat 19 gradually releases the spring 17 and permits the spring to raise gradually the armature 12 of the relay 10. As the armature rises the sensitivity of the relay gradually increases until it reaches its optimum sensitivity in the position indicated by dotted lines in Fig. 1. Under these conditions the relay 10 is sufficiently sensitive to respond to high resistance internal faults occurring in the transformer 1. It should be noted that in its heated condition the thermostat 19 is not loaded.

One of the desirable characteristics of the sensitivity control is that the sensitivity varies gradually from a minimum to an optimum value. The desirability of this characteristic may be appreciated by reference to Fig. 3, wherein a graphical representation of magnetizing in-rush current is shown. In Fig. 3 current is plotted as ordinates against time as abscissae measured from the time of closure of the circuit breaker 4. It will be noted that at the instant of closure the magnetizing in-rush current rises to an abnormally high value. The current then decays or decreases as may be seen by reference to Fig. 3. For purpose of illustration, the decay of the magnetizing current is illustrated in Fig. 3 by a dotted line.

If desired, the thermostat 19 may be given an operating characteristic which resembles that depicted by the dotted line of Fig. 3. That is, the thermostat 19 may be so designed that it increases the sensitivity of the relay 10 on heating substantially in accordance with the decay of magnetizing in-rush current. Consequently, the relay 10 is effective at all times to protect the transformer 1 against internal faults. At a point B in Fig. 3, the value of current in the winding 11 required for actuating the relay 10 is relatively high because of the insensitive condition of the relay 10. At a time corresponding to a point C of Fig. 3, the thermostat 19 has raised the armature 12 to an intermediate position at which a lower energization of the winding 11 is required for actuating the relay 10. At a still later time after energization of the transformer 1, the armature 12 rises to the position indicated in dotted lines in Fig. 1 and requires a minimum energization of the winding 11 for actuation of the relay 10. Consequently, the increment of current in excess of the magnetizing current to which the relay 10 responds may be made substantially constant over the full period of operation of the transformer 1.

In the modification illustrated in Fig. 4, the thermal responsive element or thermostat 19 is employed directly for varying the sensitivity of the relay 10. This is accomplished by positioning the thermostat 19 in contact with a portion of the armature 12 such as the bridging contact 13. As the thermostat 19 heats, it gradually moves the armature 12 and bridging contact 13 to the position illlustrated in dotted lines in which position the relay has its optimum sensitivity. In Fig. 4, an alternative method of heating the thermostat 19 is illustrated. This comprises an indirect heater such as a resistance heater 25 which is energized from the circuit including the transformer 1. Instead of employing the auxiliary transformer 22, the resistance heater 25 can be connected to the circuit of the transformer 1 either directly or through a current limiting impedance 26. The operation of the apparatus illustrated in Fig. 4 otherwise is similar to that of the apparatus illustrated in Fig. 1.

A still further modification is illustrated in Fig. 5. In Fig. 5 the armature 12 is permanently maintained in its sensitive position. However, movement of the armature 12 is opposed by the thermostat 19 which in this modification is positioned against a protruding lug or disc 27 mounted on the armature 12. As the thermostat 19 heats, the resistance which it offers to movement of the armature 12 decreases, and consequently the sensitivity of the relay employing the armature 12 increases.

It should be noted that in the illustrated embodiment of our invention no additional contacts are required for controlling the operation of the relay 10. This is desirable because of the difficulty in keeping contacts clean and operating satisfactorily.

Although we have described our invention with reference to certain specific embodiments thereof, it is obvious that numerous modifications thereof are possible. Therefore, we do not wish our invention to be restricted except as required by the appended claims when interpreted in view of the prior art.

We claim as our invention:

1. In a protective arrangement for an electrical system subject to transient current and having terminals for transmitting electrical current normally to and from said system, a protective device responsive to the difference between currents entering and leaving said electrical system through said terminals, and means responsive to the energization of said system and effective as transient current flowing in said electrical system when said system is initially energized disappears for progressively increasing the sensitivity of said protective device by successive increments.

2. In a protective arrangement for an electrical system subject to transient current and having terminals for transmitting electrical current normally to and from said system, a protective device responsive to the difference between currents entering and leaving said electrical system through said terminals, and means responsive to the energization of said system and effective during the decay of transient current flowing in said electrical system when said system is initially energized for increasing the sensitivity of said protective device, said increase in sensitivity being substantially proportional to the decay of said transient current.

3. In a protective arrangement for an electrical system subject to transient current and having terminals for transmitting electrical current normally to and from said system, a protective relay for said electrical system including a control member and means for energizing said control member in accordance with the difference between current entering and leaving said system through said terminals, said protective relay having a sensitivity dependent on the position of said control member relative to said energizing means, and means responsive to the voltage of said system and effective as transient current flowing in said system as a result of a change in energization thereof decays for changing the position of said control member relative to said energizing means.

4. In a protective arrangement, an electrical system having terminals through which current normally leaves said system, supply means for supplying current to said system, means for connecting said supply means to said system, a protective device responsive to the difference between current entering said system and current leaving said system through said terminals, and voltage responsive means effective after a connection of said supply means to said system for gradually increasing the sensitivity of said protective device.

5. In a protective arrangement for an electrical system subject to transient current and having terminals for transmitting electrical current normally to and from said system, a differential relay for protecting said system including a control member operable for progressively varying the sensitivity of said differential relay, and thermo-responsive means responsive to the energization of said system for actuating said control member, said thermo-responsive means being effective for progressively operating said control member from an insensitive setting during the initiation of a transient current in said system to a setting of greater sensitivity as said transient current decays.

6. In a protective arrangement for an electrical system, a differential relay for protecting said system, thermo-responsive means for gradually varying the sensitivity of said differential relay, and means for energizing said thermo-responsive means in accordance with a voltage condition of said system.

7. In a protective arrangement for an electrical system having terminals for transmitting electrical current to and from said system, a relay having an energizing winding and an armature member controlled by the energization of said winding, means for energizing said winding in accordance with the difference between currents entering and leaving said electrical system through said terminals, a thermo-responsive element effective in response to a decrease in temperature thereof for gradually moving said armature member into less effective relationship relative to said energizing winding, and means for energizing said thermo-responsive element in accordance with the energization of said electrical system.

8. In a protective arrangement for an electrical system, a differential relay for protecting said system including a control member operable for gradually varying the sensitivity of said differential relay, means for urging said control member into a predetermined first condition, thermo-responsive means for gradually actuating said control member into a second condition, and means connecting said thermo-responsive means for energization in accordance with the energization of said electrical system.

9. In a protective arrangement for an electrical system, a differential relay for protecting said system, control means for opposing operation of said differential relay, said control means including thermo-responsive means effective when energized for decreasing said opposition to operation of said differential relay, and means controlled by the energization of said electrical system for energizing said thermo-responsive means.

10. In a protective arrangement for an electrical transformer having terminals, a protective relay having an armature member and a single control winding for said armature, means for energizing said winding in accordance with the difference between current entering and leaving said electrical transformer through said terminals, a thermo-responsive element responsive to an increase in temperature for progressively moving said armature member into more effective relationship relative to said winding, and means for energizing said thermo-responsive element in accordance with the voltage across a winding of said transformer.

11. In a protective arrangement for an electrical transformer having terminals, a protective relay having an armature member and a single control winding for said armature, means for energizing said winding in accordance with the difference between current entering and leaving said electrical transformer through said terminals, said armature member being movable in response to energization of said winding, and control means in the path of movement of said armature member for restraining movement thereof, said control means including thermo-responsive means effective when energized for decreasing the restraint exercised by said control means on said armature member, and means for energizing said thermo-responsive means in accordance with the voltage across a winding of said transformer.

GEORGE M. BARROW.
BERNARD E. LENEHAN.